UNITED STATES PATENT OFFICE.

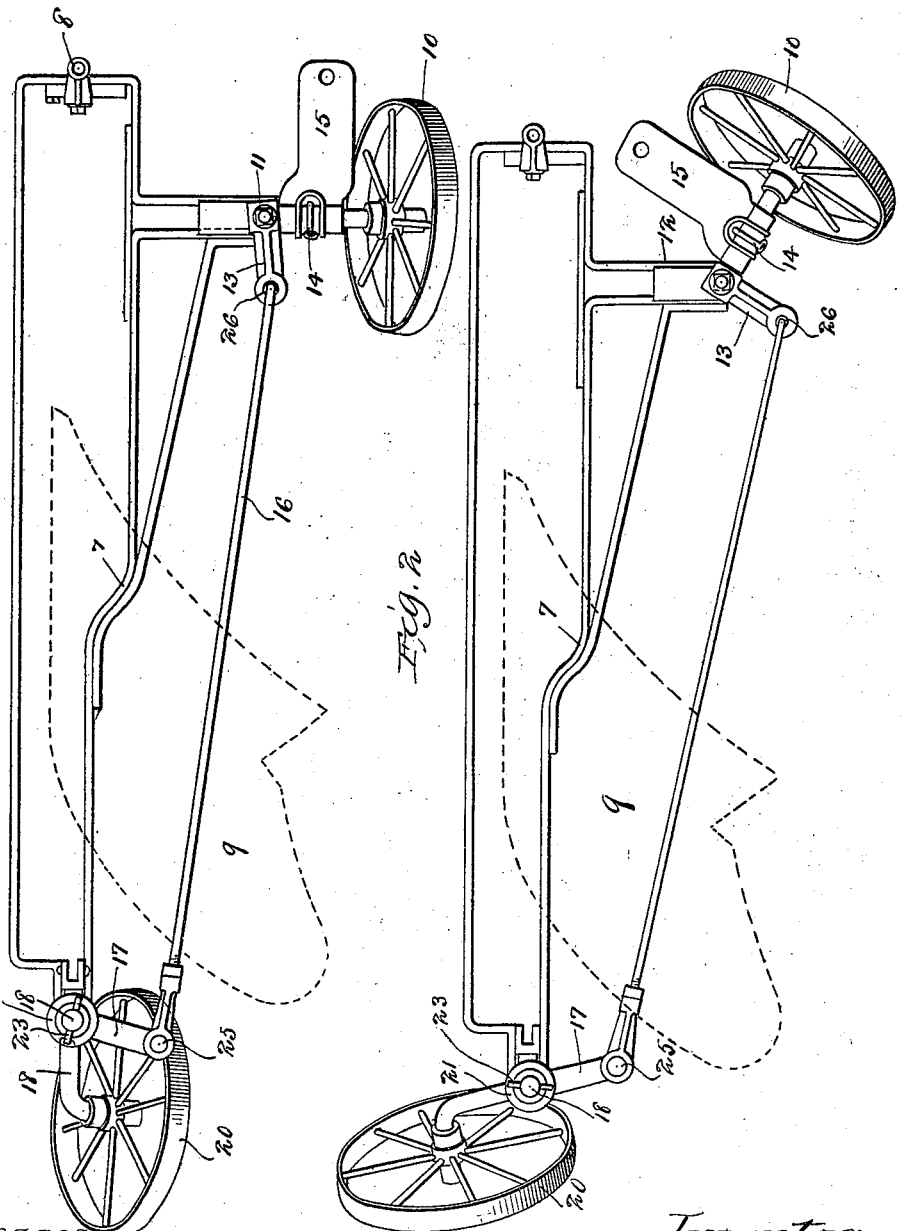

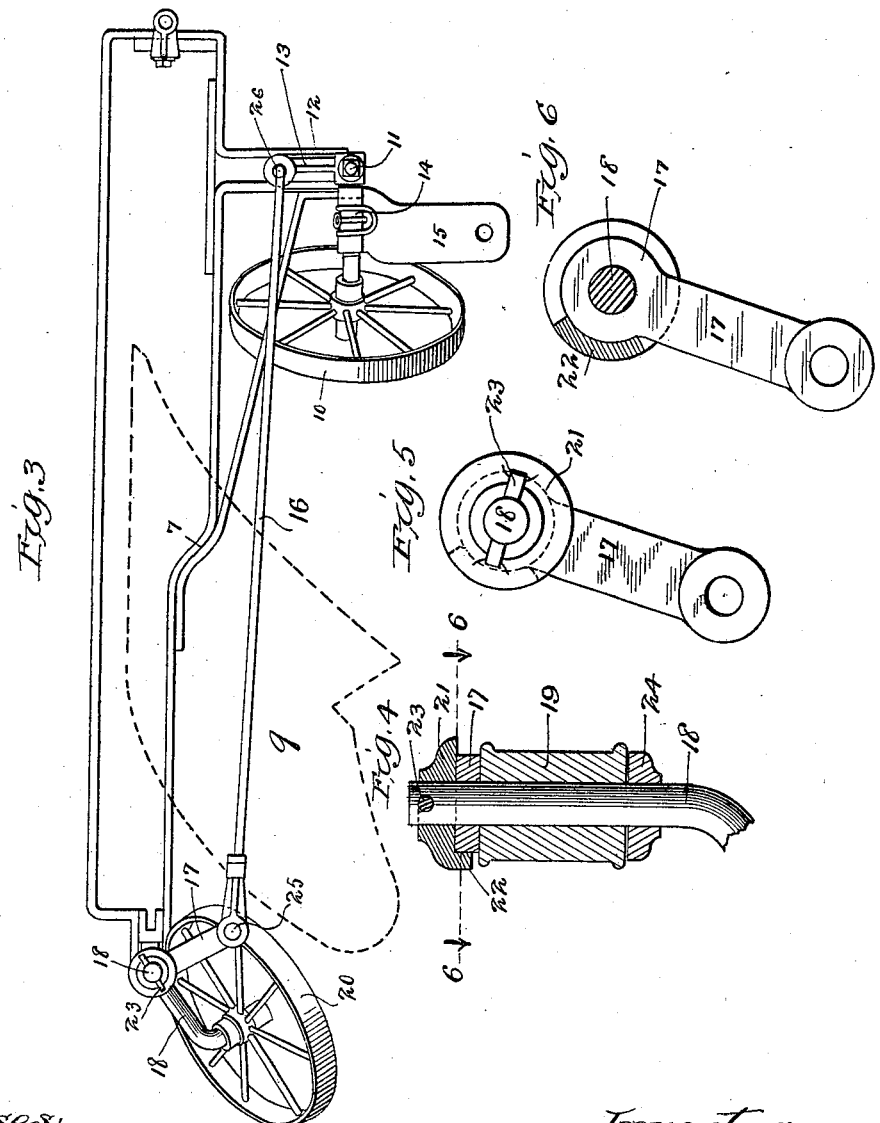

WILLIAM T. M. BRUNNEMER, OF BRADLEY, ILLINOIS, ASSIGNOR TO THE DAVID BRADLEY MANUFACTURING COMPANY, OF SAME PLACE.

PLOW.

SPECIFICATION forming part of Letters Patent No. 644,316, dated February 27, 1900.

Application filed February 27, 1899. Serial No. 706,955. (No model.)

*To all whom it may concern:*

Be it known that I, WILLIAM T. M. BRUNNEMER, a citizen of the United States, residing at Bradley, in the county of Kankakee and State of Illinois, have invented certain new and useful Improvements in Plows, of which the following is a specification, reference being had to the accompanying drawings.

My invention relates to plows, and has for its principal object to provide traction mechanism arranged back of the furrow-opener for counteracting to a greater or less extent the side pressure upon the furrow-opener, so that it will operate properly even if the landside is entirely wanting or is inoperative, as in cleaning up a dead-furrow, where there is no shoulder or bank against which the landside may bear.

In the embodiment of my invention herein illustrated the traction mechanism consists of a caster-wheel arranged back of the furrow-opener and operating to direct and hold the plow away from the bank of the furrow; but my invention is not restricted to the device shown and described.

A further object is to provide certain improvements in plows of the general type illustrated, by which the front furrow-wheel will be so operated as to run with a slight gather, thereby securing a uniform and even width of furrow.

A further object is to provide improved means whereby the caster-wheel is allowed to swing in either direction freely when the team is turned in one direction or the other.

I accomplish these objects as hereinafter specified, and as illustrated in the drawings.

That which I regard as new will be set forth in the claims.

In the accompanying drawings, Figure 1 is a plan view showing the caster and furrow wheels in position for plowing. Fig. 2 is a similar view showing the position of the caster and furrow wheels when the team is turned to the left. Fig. 3 is a similar view showing the position of said wheels when the team is turned to the right. Fig. 4 is a section of the upper end of the furrow-wheel pivot. Fig. 5 is a plan view of the same, and Fig. 6 is a section on line 6 6 of Fig. 4.

Referring to the drawings, 7 indicates the frame of the machine, which is of suitable shape and construction to support the various parts and is provided at its forward end with a suitable connecting device 8, by which the draft devices are secured to it.

9 indicates the plow.

10 indicates the front furrow-wheel, which is mounted upon a suitable bent axle 11, the vertical portion of which is pivoted in a suitable bearing formed in a bracket 12, projecting laterally from the frame of the machine, as shown in the drawings. At its upper end the shaft 11 carries a bell-crank having arms 13 14 arranged substantially at right angles to each other, as shown in the drawings. The arm 14 carries a bracket 15, to which the tongue is connected. The arm 13 is connected by a rigid connecting-bar 16 to a lever 17, secured upon the upper end of a bent axle 18, pivoted in a sleeve 19, carried at the rear end of the frame of the machine, as shown in the drawings. In Fig. 1 the bar 16 is shown screw-threaded at one end, so that its length may be adjusted. The bent lower end of the axle 18 forms a spindle for the caster-wheel 20. The lever 17 is loosely mounted upon the upper portion of the axle 18, and above said lever is a disk 21, provided with a depending segment 22, as shown in Figs. 4 and 6. The disk 21 is keyed to the axle 18 by a pin 23, which passes through the upper end of the axle and through a slot or recess in the disk, as shown in Figs. 4 and 5. The arrangement is such that the lever 17 is free to rotate through about two hundred and seventy degrees independently of the disk 21 and axle 18. When, however, in rotating the lever 17 it engages the segment 22, further rotation of the lever rotates the axle. Instead of a continuous segment 22 separate lugs suitably disposed may be employed.

24 indicates a collar upon the axle 18 below the sleeve 19.

25 indicates the pivot by which the connecting-rod 16 is connected to the lever 17, and 26 indicates the point at which the front end of the connecting-rod 16 is connected to the arm 13.

The parts of the machine are so adjusted that when the rear furrow or caster wheel 20 is in the position shown in Fig. 1, inclining slightly toward the front furrow-wheel, the front furrow-wheel will be inclined slightly toward the line of the furrow being plowed and the point 26 will be slightly outside of a line drawn from the pivot of the axle 11 to the pivot 25. At this time the lever 17 will be in engagement with the outer end of the segment 22, as shown in Figs. 5 and 6. By this construction the power derived from the tendency of the rear furrow or caster wheel to turn in toward the furrow is transmitted through the segment 22 to the lever 17, the end thrust being then transmitted through the connecting-rod 16 to the arm 13, and, owing to the fact that the point 26 is outside of a straight line between the pivot 25 and the pivot of the axle 11, as above stated, the end thrust caused by the caster-wheel will tend to turn the front furrow-wheel inward toward the furrow. The result of this arrangement and operation is that the lateral pressure upon the plow, which is usually resisted by the bank, is in this case resisted by the caster-wheel, the angle or gather of the caster-wheel counteracting by traction the side pressure of the plow, so that the landside is relieved of friction on the bank, making the plow run more smoothly.

In prior constructions the caster-wheel has usually been arranged to run in the corner of the furrow; but in my construction this is not necessary, because the caster-wheel operates by traction, as above stated. By transmitting the end thrust to the axle of the front furrow-wheel, as above described, and directing said wheel inward, as described, said wheel acts to counteract the tendency of the plow to run off to one side, thereby making it easier for the operator to guide the plow and secure an even width of furrow. When the team is turned in one direction or the other, owing to the arrangement of the lever 17 in connection with the disk 21 and segment 22, the caster-wheel is free to turn in either direction, as illustrated in Figs. 2 and 3.

While I have described specifically the plow illustrated in the drawings, my invention, especially so far as concerns the broad features of counteracting by traction the side pressure upon the furrow-opener to a greater or less extent and arranging the front furrow-wheel so as to run with a greater or less gather, is not limited to the particular construction and arrangement shown and described, as various modifications may be made without departing from it.

That which I claim as my invention, and desire to secure by Letters Patent, is—

1. In a plow, the combination with a machine-frame, of a furrow-wheel pivoted to swing about a substantially-vertical axis, a crank connected to the pivot of said furrow-wheel, a caster-wheel pivoted to swing about a substantially-vertical axis, a lever connected to the pivot of said caster-wheel and normally extending at an angle to the line of travel, and a rigid connecting device connecting said lever and crank, said connecting device being arranged to lie slightly outside of a line drawn through the point of its connection with said lever and the pivot of the furrow-wheel, substantially as described.

2. In a plow, the combination with a machine-frame, of a furrow-wheel pivoted to swing about a substantially-vertical axis, a crank connected to the pivot of said furrow-wheel, a caster-wheel, and means for transmitting power derived from the tendency of said caster-wheel to rotate to said crank in a line lying outside of the pivot of said furrow-wheel, substantially as and for the purpose specified.

3. In a plow, the combination with a machine-frame, of a furrow-wheel pivoted to swing about a substantially-vertical axis, a caster-wheel also pivoted to swing about a substantially-vertical axis, and means operating normally to hold said furrow-wheel slightly inclined inwardly toward the furrow, substantially as described.

4. In a plow, the combination with a machine-frame, of a furrow-wheel pivoted to swing about a substantially-vertical axis, a caster-wheel also pivoted to swing about a substantially-vertical axis, and means operating to hold said caster-wheel normally in a position inclined slightly out from the furrow, substantially as and for the purpose specified.

5. In a plow, the combination with a machine-frame, of a furrow-wheel having a vertically-pivoted axle 11, a crank 13 connected to said axle, a caster-wheel having a vertically-pivoted axle 18, a lever 17 mounted upon said axle, and a rigid adjustable connecting-rod 16 connecting said crank and lever, the point of connection of said rod and crank lying normally outside of a line drawn from the point of connection of said rod and lever and the pivot of the axle 11, substantially as described.

6. In a plow, the combination with a machine-frame, of a furrow-wheel pivoted to swing about a substantially-vertical axis, a caster-wheel also pivoted to swing about a substantially-vertical axis, a crank 13 connected to the axle of the furrow-wheel, a lever 17 connected to the axle of said caster-wheel, said lever being adapted to rotate partially independently of the axle of the caster-wheel, and a stop limiting the extent to which said lever may rotate independently of said axle, substantially as described.

7. In a plow, the combination with a machine-frame, of a furrow-wheel pivoted to swing about a substantially-vertical axis, a caster-wheel also pivoted to swing about a substantially-vertical axis, a crank 13 connected to the axle of the furrow-wheel, a lever 17 connected to the axle of said caster-wheel, said lever being adapted to rotate partially independently of the axle of the caster-wheel, and a disk 21 mounted upon said axle and keyed thereto, said disk having a segment 22 adapted to engage said lever, substantially as described.

8. In a plow, the combination with a machine-frame, of a furrow-wheel pivoted to swing about a substantially-vertical axis, a caster-wheel also pivoted to swing about a substantially-vertical axis, and means operating normally to hold said furrow-wheel inclined slightly toward the furrow and to hold said caster-wheel normally inclined slightly out from the furrow, substantially as and for the purpose specified.

9. In a plow the combination of a machine-frame, a caster-wheel pivoted to swing about a substantially-vertical axis, and means operating to hold said caster-wheel normally at an angle outwardly inclined to the line of draft, substantially as and for the purpose specified.

10. A plow having a furrow-opener, adjustable traction mechanism arranged back of the furrow-opener which acts normally to exert outward pressure upon the furrow-opener and means operated by the team for controlling the action of said traction mechanism, substantially as and for the purposes specified.

11. The combination of a machine-frame, a caster-wheel adapted to swing about a substantially-vertical axis, a laterally-extending lever loosely connected with said caster-wheel, means limiting the independent movement of said lever and caster-wheel when in operative position, a substantially-horizontal arm or crank, and means connecting said lever and arm, substantially as described.

12. The combination of a machine-frame, a caster-wheel having a vertically-extending axle arranged to rotate in a suitable bearing, a lever loosely mounted on said axle and extending laterally, means carried by said axle adapted to engage said lever to limit the independent movement of said lever and axle, a substantially-horizontal arm or crank, and means connecting said lever and arm, substantially as described.

WILLIAM T. M. BRUNNEMER.

Witnesses:
 GEO. H. FRANCIS,
 GEORGE C. MORGAN, Jr.